United States Patent
Oami et al.

Patent Number: 5,790,441
Date of Patent: Aug. 4, 1998

[54] LOSSLESS TRANSFORM CODING SYSTEM FOR DIGITAL SIGNALS

[75] Inventors: Ryoma Oami; Mutsumi Ohta, both of Tokyo, Japan

[73] Assignee: NEC Corporation, Tokyo, Japan

[21] Appl. No.: 720,327

[22] Filed: Sep. 27, 1996

[30] Foreign Application Priority Data

Sep. 27, 1995 [JP] Japan ................... 7-249962

[51] Int. Cl.[6] .................................... G06F 17/14
[52] U.S. Cl. .................. 364/725.01; 364/725.03
[58] Field of Search ................. 364/725.01, 725.02, 364/725.03, 726.01, 726.02, 726.03, 726.06, 727.01; 382/244

[56] References Cited

U.S. PATENT DOCUMENTS

| | | | |
|---|---|---|---|
| 4,862,263 | 8/1989 | Strobach et al. | 348/408 |
| 5,408,425 | 4/1995 | Hou | 364/725.03 |
| 5,590,066 | 12/1996 | Ohki | 364/725.02 |
| 5,621,676 | 4/1997 | Iwata | 364/725.03 |
| 5,703,799 | 12/1997 | Ohta | 364/725.03 |

FOREIGN PATENT DOCUMENTS

2-62993  12/1990  Japan.

*Primary Examiner*—Chuong Dinh Ngo
*Attorney, Agent, or Firm*—Foley & Lardner

[57] ABSTRACT

The invention provides a reversible eight-element discrete cosine transform system which can be realized with a practical circuit and provide transform values proximate to those obtained by actual eight-element discrete cosine transform. In 4×4 matrix transform which appears when eight-element discrete cosine transform is decomposed in accordance with a high speed calculation method, transform values ($X_1$, $X_7$, $X_3$, $X_5$) are divided into ($X_1$, $X_7$) and ($X_3$, $X_5$), and if ($X_1$, $X_7$) are determined, then possible values as ($X_3$, $X_5$), are limited. This is utilized for quantization of the elements. ($X_1$, $X_7$) are quantized with step sizes of $k_1$ and $k_2$ by operators to obtain quantization values ($Q_1$,) $Q_7$). Meanwhile, from ($X_3$, $X_5$), global quantization values are obtained by a quantizer using a conventional reversible quantization technique while local quantization values are obtained using a second numerical value table, and quantization values ($Q_3$, $Q_5$) are obtained from the values of the gloval quantization values and the local quantization values. Then, an eight-element discrete cosine transform system is constructed by a combination of reversible transform quantization of a 4×4 matrix and conventional reversible transform quantization of a 2×2 matrix.

6 Claims, 6 Drawing Sheets

LOSSLESS TRANSFORM CODING SYSTEM FOR DIGITAL SIGNALS

BACKGROUND OF THE INVENTION

1. Field of the Invention

This invention relates to transform coding f or digital signals, and more particularly to coding for video signals.

2. Description of the Related Art

A linear transform coding system is known as a coding system for an audio or video signal. In the linear transform coding system, a plurality of discrete signals are linearly transformed first to obtain transform coefficients and then the transform coefficients are coded. By suitable selection of the base of the linear transform taking statistical characteristics of the signals into consideration, compression coding can be realized. It is known that a coding system which employs discrete cosine transform as such linear transform can achieve the highest compression coding of signals which conform to a highly correlated Markov probability model, and is utilized widely for international standardized systems.

While the discrete cosine transform is useful to achieve high compression coding in this manner, since it uses real numbers for the base of the transform, in order to realize lossless reversible coding, the quantization step size must be set small. This, however, gives rise to a disadvantage that the coding efficiency is deteriorated.

A system which achieve reversible coding such as discrete cosine transform without such deterioration in coding efficiency have been proposed. It is a "Lossless Transform Coding System for Digital Signals" proposed precedently by Mutsumi Ohta, one of the inventors of the present invention. In this system, reversible quantization is performed taking a discrete structure of transform coefficients using an integer matrix to which the transform is approximated to achieve reversible coding. In the following, the principle of this system is described.

According to the system, a transform matrix is multiplied by fixed numbers for individual rows and half-adjusted to obtain another matrix whose elements are integers, and then, integer N-element original signal vectors $(x_0, \ldots, x_{N-1})$ are transformed with the integer matrix to obtain vectors (hereinafter referred to as transform points) $(X_0, \ldots, X_{N-1})$ in a transform domain. While reversible coding can be achieved by the transform, since the density of the transform points is given by a reciprocal number $1/D$ to the determinant $D$ of the integer matrix used for the transform, as the value of $D$ increases, the number of useless integer points which do not make transform points in the transform domain increases, resulting in deterioration of the coding efficiency.

In order to eliminate such redundancies, reversible quantization is performed taking a discrete structure of transform points into consideration. It can be proved that the transform point structure has a period $D$ with regard to each axis. Therefore, if the quantization periods of the individual axes which are multiples of $D$ are represented by $(d_0, \ldots, d_{N-1})$ and reversible quantization in regions of $0 \leq X_0 \leq d_0 - 1, \ldots 0 \leq X_{N-1} \leq d_{N-1} - 1$ around the origin is defined artificially, then reversible quantization of an arbitrary transform point can be performed making use of the periodicity.

First, $(X_0, \ldots X_{N-1})$ are divided by the quantization periods $(d_0, \ldots, d_{N-1})$ to obtain quotients $(a_0, \ldots, a_{N-1})$ and remainders $(r_0, \ldots r_{N-1})$, respectively, and the quantization defined as above is performed for the remainders $(r, \ldots, r_{N-1})$ to obtain quantization values $(q, \ldots, q_{N-1})$ of the remainders $(r, \ldots, r_{N-1})$, respectively. Then, calculation given by the following expression is performed to obtain quantization values $(Q, \ldots, Q_{N-1})$ of the transform points:

$$Q_i = a_i m_i + q_i \quad (i=0, \ldots, N-1) \tag{1}$$

where $m_i$ $(i=0, 1, \ldots, N-1)$ is a width (range) of the possible values as $q_i$. The redundancies of the transform points can be removed by quantization using the technique described above.

On the other hand, in inverse transform, $(Q, \ldots Q_{N-1})$ are first divided by $(m, \ldots, m_{N-1})$ to obtain quotients $(a, \ldots, a_{N-1})$ and remainders $(q, \ldots, q_{N-1})$, respectively. Then, dequantization is performed for the remainders $(q, \ldots, q_{N-1})$ to obtain $(r, \ldots, r_{N-1})$. Then, calculation given by the following expression:

$$X_i = a_i d_i + r_i \quad (i=0, \ldots, N-1) \tag{2}$$

is performed, thereby achieving reversible dequantization. After the dequantization, the transform points $(X, \ldots, X_{N-1})$ are linearly transformed with an inverse matrix to the original integer matrix to obtain the original signals $(X, \ldots, X_{N-1})$.

In two-element discrete cosine transform, a matrix is approximated with $$\begin{pmatrix} 1 & 1 \\ 1 & -1 \end{pmatrix} \tag{3}$$

In this instance, since the determinant $D$ is $D=2$, if reversible quantization is set in a basic region of $2 \times 2$, $4 \times 4$, $8 \times 8$, $16 \times 8$ or the like, reversible quantization for all inputs can be performed using the method described above.

In four-element discrete cosine transform, a matrix can be approximated, using suitable integers $c_2$, $c_4$ and $c_6$, with a matrix transform of $$\begin{pmatrix} X_0 \\ X_1 \\ X_2 \\ X_3 \end{pmatrix} = \begin{pmatrix} c_4 & c_4 & c_4 & c_4 \\ c_2 & c_6 & -c_6 & -c_2 \\ c_4 & -c_4 & -c_4 & c_4 \\ c_6 & -c_2 & c_2 & -c_6 \end{pmatrix} \begin{pmatrix} x_0 \\ x_1 \\ x_2 \\ x_3 \end{pmatrix} \tag{4}$$

In this instance, an applicable high speed calculation method is available and can decompose the matrix transform into four $2 \times 2$ matrix transforms given by $$\begin{pmatrix} x_0 + x_3 \\ x_0 - x_3 \end{pmatrix} = \begin{pmatrix} 1 & 1 \\ 1 & -1 \end{pmatrix} \begin{pmatrix} x_0 \\ x_3 \end{pmatrix} \tag{5}$$

$$\begin{pmatrix} x_1 + x_2 \\ x_1 - x_2 \end{pmatrix} = \begin{pmatrix} 1 & 1 \\ 1 & -1 \end{pmatrix} \begin{pmatrix} x_1 \\ x_2 \end{pmatrix} \tag{6}$$

$$\begin{pmatrix} X_0 \\ X_2 \end{pmatrix} = \begin{pmatrix} c_4 & c_4 \\ c_4 & -c_4 \end{pmatrix} \begin{pmatrix} x_0 + x_3 \\ x_1 + x_2 \end{pmatrix} \tag{7}$$

$$\begin{pmatrix} X_1 \\ X_3 \end{pmatrix} = \begin{pmatrix} c_2 & c_6 \\ c_6 & -c_2 \end{pmatrix} \begin{pmatrix} x_0 - x_3 \\ x_1 - x_2 \end{pmatrix} \tag{8}$$

By applying the method described above to the individual transforms, reversible transform free from redundancies can be achieved readily.

In eight-element discrete cosine transform, a matrix can be approximated, using suitable integers $c_1$, $c_2$, $c_3$, $c_4$, $c_5$, $c_6$ and $c_7$, with a matrix transform of $$\begin{pmatrix} X_0 \\ X_1 \\ X_2 \\ X_3 \\ X_4 \\ X_5 \\ X_6 \\ X_7 \end{pmatrix} = \begin{pmatrix} c_4 & c_4 & c_4 & c_4 & c_4 & c_4 & c_4 & c_4 \\ c_1 & c_3 & c_5 & c_7 & -c_7 & -c_5 & -c_3 & -c_1 \\ c_2 & c_6 & -c_6 & -c_2 & -c_2 & -c_6 & c_6 & c_2 \\ c_3 & -c_7 & -c_1 & -c_5 & c_5 & c_1 & c_7 & -c_3 \\ c_4 & -c_4 & -c_4 & c_4 & c_4 & -c_4 & -c_4 & c_4 \\ c_5 & -c_1 & c_7 & c_3 & -c_3 & -c_7 & c_1 & -c_5 \\ c_6 & -c_2 & c_2 & -c_6 & -c_6 & c_2 & -c_2 & c_6 \\ c_7 & -c_5 & c_3 & -c_1 & c_1 & -c_3 & c_5 & -c_7 \end{pmatrix} \begin{pmatrix} x_0 \\ x_1 \\ x_2 \\ x_3 \\ x_4 \\ x_5 \\ x_6 \\ x_7 \end{pmatrix} \quad (9)$$

Also in this instance, an applicable high speed calculation method is available and can decompose the matrix transform into matrix transforms given by $$\begin{pmatrix} x_0 + x_7 \\ x_0 - x_7 \end{pmatrix} = \begin{pmatrix} 1 & 1 \\ 1 & -1 \end{pmatrix} \begin{pmatrix} x_0 \\ x_7 \end{pmatrix} \quad (10)$$

$$\begin{pmatrix} x_1 + x_6 \\ x_1 - x_6 \end{pmatrix} = \begin{pmatrix} 1 & 1 \\ 1 & -1 \end{pmatrix} \begin{pmatrix} x_1 \\ x_6 \end{pmatrix} \quad (11)$$

$$\begin{pmatrix} x_2 + x_5 \\ x_2 - x_5 \end{pmatrix} = \begin{pmatrix} 1 & 1 \\ 1 & -1 \end{pmatrix} \begin{pmatrix} x_2 \\ x_5 \end{pmatrix} \quad (12)$$

$$\begin{pmatrix} x_3 + x_4 \\ x_3 - x_4 \end{pmatrix} = \begin{pmatrix} 1 & 1 \\ 1 & -1 \end{pmatrix} \begin{pmatrix} x_3 \\ x_4 \end{pmatrix} \quad (13)$$

$$\begin{pmatrix} x_0 + x_7 + x_3 + x_4 \\ x_0 + x_7 - x_3 - x_4 \end{pmatrix} = \begin{pmatrix} 1 & 1 \\ 1 & -1 \end{pmatrix} \begin{pmatrix} x_0 + x_7 \\ x_4 + x_3 \end{pmatrix} \quad (14)$$

$$\begin{pmatrix} x_1 + x_6 + x_2 + x_5 \\ x_1 + x_6 - x_2 - x_5 \end{pmatrix} = \begin{pmatrix} 1 & 1 \\ 1 & -1 \end{pmatrix} \begin{pmatrix} x_1 + x_6 \\ x_2 + x_5 \end{pmatrix} \quad (15)$$

$$\begin{pmatrix} X_0 \\ X_4 \end{pmatrix} = \begin{pmatrix} c_4 & c_4 \\ c_4 & -c_4 \end{pmatrix} \begin{pmatrix} x_0 + x_7 + x_3 + x_4 \\ x_1 + x_6 + x_2 + x_5 \end{pmatrix} \quad (16)$$

$$\begin{pmatrix} X_2 \\ X_6 \end{pmatrix} = \begin{pmatrix} c_2 & c_6 \\ c_6 & -c_2 \end{pmatrix} \begin{pmatrix} x_0 + x_7 - x_3 - x_4 \\ x_1 + x_6 - x_2 - x_5 \end{pmatrix} \quad (17)$$

$$\begin{pmatrix} X_1 \\ X_7 \\ X_3 \\ X_5 \end{pmatrix} = \begin{pmatrix} c_1 & c_7 & c_3 & c_5 \\ c_7 & -c_1 & -c_5 & c_3 \\ c_3 & -c_5 & -c_7 & -c_1 \\ c_5 & c_3 & -c_1 & c_7 \end{pmatrix} \begin{pmatrix} x_0 - x_7 \\ x_3 - x_4 \\ x_1 - x_6 \\ x_2 - x_5 \end{pmatrix} \quad (18)$$

Since the first eight transforms given by the expressions (10) to (17) are 2×2 matrix transforms, the method described above can be applied readily to them. However, the last 4×4 matrix transform given by the expression (18) requires such a large region for definition of quantization that a practical circuit for it cannot be realized. In particular, the determinant D of the matrix of the expression (18) is given by $$D = (c_1^2 - c_7^2 + 2c_3c_5)^2 + (c_3^2 - c_5^2 + 2c_1c_7)^2 \quad (19)$$

and the reciprocal number 1/D to D in this instance represents the density of the transform points. Consequently, in order to produce a quantization table using the technique described above, a table having at least $D^3$ elements must be produced. Since the size of the table increases in proportion to the cube of the determinant D, where D is very large, it is difficult to realize the reversible quantization. For example, in the case of four-element discrete cosine transform by the aforementioned "Lossless Transform Coding System for Digital Signals" wherein ($c_1$, $c_3$, $c_5$, $c_7$)=(5, 4, 3, 1), since the determinant D is D=2,593, a quantization table having at least $2,593^3$ elements is required, which is not practical.

Figure 6:
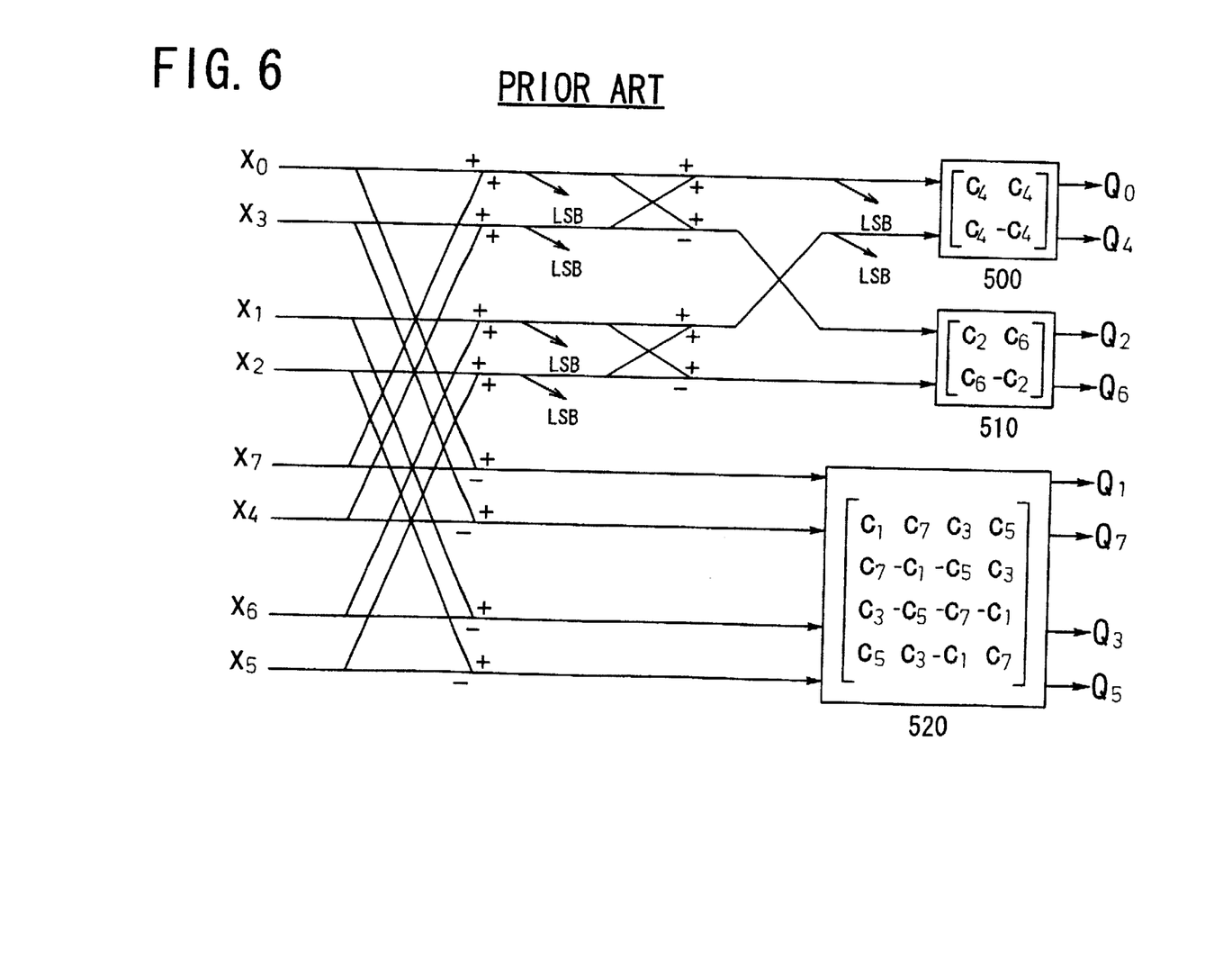
FIG. 6 is a block diagram showing a conventional eight-element reversible discrete cosine transform system.

Further, in order to realize the eight-element reversible discrete cosine transform based on the method described above, such a circuit as shown in FIG. 6 is used. Where the circuit of FIG. 6 is employed, redundancies are removed by deleting the least significant bit of one of two calculation results for each butterfly calculation at the first and middle stages corresponding to the expressions (10) to (15) given hereinabove, the dynamic range of the calculation result from which the least significant bit has been deleted is reduced to ½ that of the other calculation result. As a result, the dynamic ranges of transform coefficients obtained finally are different among the different coefficients, and accordingly, the transform coefficients obtained finally are different in dynamic range from transform coefficients of actual discrete cosine transform.

SUMMARY OF THE INVENTION

It is an object of the present invention to provide a lossless transform coding system for digital signals which can readily achieve transform and reversible quantization based on a matrix of the expression (18) given hereinabove in an eight-element reversible discrete cosine transform system.

It is another object of the present invention to correct transform coefficients obtained by eight-element reversible discrete cosine transform so as to approach transform coefficients obtained by actual eight-element discrete cosine transform.

In order to attain the objects described above, according to an aspect of the present invention, there is provided a reversible transform system for reversibly transforming integer four-element vectors ($u_4$, $u_5$, $u_6$, $u_7$) into quantization values ($Q_1$, $Q_7$, $Q_3$, $Q_5$), comprising means for linearly transforming the integer four-element vectors ($u_4$, $u_5$, $u_6$, $u_7$) with an integer matrix $$\begin{pmatrix} c_1 & c_7 & c_3 & c_5 \\ c_7 & -c_1 & -c_5 & c_3 \\ c_3 & -c_5 & -c_7 & -c_1 \\ c_5 & c_3 & -c_1 & c_7 \end{pmatrix}$$

to obtain transform values ($X_1$, $X_7$, $X_3$, $X_5$), means for dividing the transform values $X_1$ and $X_7$ by natural numbers $k_1$ and $k_7$ and half-adjusting quotients of the division to obtain quantization values $Q_1$ and $Q_7$, respectively, means for multiplying the natural numbers $k_1$ and $k_7$ by the quantization values $Q_1$ and $Q_7$ to obtain products $k_1Q_1$ and $k_7Q_7$ and subtracting the products $k_1Q_1$ and $k_7Q_7$ from the transform values $X_1$ and $X_7$ to obtain remainder values $r_1$ and $r_7$, respectively, means for determining representative elements ($s_3$, $s_5$) based on a first numerical value table using the transform values ($X_1$, $X_7$) or the transform values ($X_3$, $X_5$), means for subtracting the representative elements ($s_3$, $s_5$) from the transform values ($X_3$, $X_5$), respectively, to obtain vectors, means for reversibly transforming and quantizing the vectors obtained by the subtracting means to obtain global quantization values ($q_3$, $q_5$), means for determining local quantization values ($q'_3$, $q'_5$) of the transform values ($X_3$, $X_5$) from the remainders ($r_1$, $r_7$) based on a second numerical value table, and means for multiplying the global quantization values ($q_3$, $q_5$) by natural numbers ($m_3$, $m_5$) and adding the local quantization values ($q'_3$, $q'_5$) to products of the multiplication to obtain quantization values ($Q_3$, $Q_5$) of the transform values ($X_3$, $X_5$), respectively.

The reversible transform system may be constructed such that, first, using g and h defined by $g=c_1^2-c_7^2+2c_3c_5$ and $h=c_3^2-c_5^2+2c_1c_7$ with the integers $c_1$, $c_3$, $c_5$ and $c_7$, a value of one of $gX_1+hX_7$, $gX_7-hX_1$, $hX_3+gX_5$, and $hX_5-gX_3$ is calculated from the transform values $X_1$, $X_3$, $X_5$ and $X_7$, next, a remainder is calculated when the obtained value is divided by D defined by $D=(c_1^2-c_7^2+2c_3c_5)^2+(c_3^2-c_5^2+2c_1c_7)^2$, and then, the remainder is used as an input to the first numerical value table.

Or, the reversible transform system may be constructed such that, first, using the natural numbers $k_1$ and $k_7$, g and h defined by $g=c_{12}-c_7^2+2c_3c_5$ and $h=c_3^2-c_5^2+2c_1c_7$ with the integers $c_1$, $c_3$, $c_5$ and $c_7$, a value of one of $gk_1Q_1+hk_7Q_7$ and $gk_7Q_7-hk_1Q_1$ is calculated from the quantization values $Q_1$ and $Q_7$, next, a remainder is calculated when the obtained value is devided by D defined by $D=(c_1^2-c_7^2+2c_3c_5)^2+(c_3^2-c_5^2+2c_1c_7)^2$, and then, the remainder is used as an index for the second numerical value table.

The inputs $(u_4, u_5, u_6, u_7)$ in the 4×4 matrix transform given by the expression (18) given hereinabove are assumed to be integer vectors, and transform points are represented by $(X_1, X_7, X_3, X_5)$. It can be proved that, if two values of the transform points $(X_1, X_7)$ are determined, then the possible values as the remaining transform points $(X_3, X_5)$, are limited to $$\begin{pmatrix} X_3 \\ X_5 \end{pmatrix} = \begin{pmatrix} h & -g \\ g & h \end{pmatrix} \begin{pmatrix} n_1 \\ n_2 \end{pmatrix} + \begin{pmatrix} s_3 \\ s_5 \end{pmatrix} \quad (20)$$

where $g=c_1^2-c_7^2+2c_3c_5$ and $h=c_3^2-c_5^2+2c_1c_7$, $n_1$ and $n_2$ are arbitrary integers, and $(s_3, s_5)$ are integer vectors limited from the transform points $(X_1, X_7)$. The present embodiment makes use of this transform point structure.

First, with the matrix of the expression (18), the integer vectors $(u_4, u_5, u_6, u_7)$ are linearly transformed into the transform points $(X_1, X_7, X_3, X_5)$. Then, of those transform values $X_1$, $X_7$, $X_3$ and $X_5$, the two transform values $X_1$ and $X_7$ are quantized using the following expressions (21) and (22), respectively:

$$Q_1 = rnd\left(\frac{X_1}{k_1}\right) \quad (21)$$

$$Q_7 = rnd\left(\frac{X_7}{k_7}\right) \quad (22)$$

where $k_1$ and $k_7$ are natural numbers corresponding to step sizes of the transform values $X_1$ and $X_7$, respectively, and rnd(x) is a function which gives back a half-adjusted value of x. In this instance, also remainders $r_1=X_1-Q_1k_1$ and $r_7=X_7-Q_7k_7$ are calculated simultaneously.

Then, the transform values $X_3$ and $X_5$ are quantized using the relation of the expression (20) given above. The transform values $X_3$ and $X_5$ are divided into two parts of differences $(X_3-s_3, X_5-s_5)$ and representative elements $(s_3, s_5)$, and the differences $(X_3-s_3, X_5-s_5)$ are quantized into global quantization values $(q_3, q_5)$ while the representative elements $(s_3, s_5)$ are quantized into local quantization values $(q'_3, q'_5)$. Then, from the local quantization values and the global quantization values, quantization values $Q_3$ and $Q_5$ are calculated using the following expressions (23) and (24):

$$Q_3 = q_3m_3+q'_3 \quad (23)$$

$$Q_5 = q_5m_5+q'_5 \quad (24)$$

where $m_3$ and $m_5$ are natural numbers and represent ranges of the local quantization values $q'_2$ and $q'_5$, respectively. Since $$\begin{pmatrix} X_3 - s_3 \\ X_5 - s_5 \end{pmatrix} = \begin{pmatrix} h & -g \\ g & h \end{pmatrix} \begin{pmatrix} n_1 \\ n_2 \end{pmatrix} \quad (25)$$

the structure of entire possible points $(X_3-s_3, X_5-s_5)$ has periodicity of the period $D=h^2+g^2$ in each axial direction. Therefore, reversible quantization of the differences $(X_3-s_3, X_5-s_5)$ is performed with a matrix $$\begin{pmatrix} h & -g \\ g & h \end{pmatrix} \quad (26)$$

using a conventional technique to obtain quantization values $(q_3, q_5)$.

By the way, the transform values $X_1$ and $X_7$ are quantized with the step sizes $k_1$ and $k_7$, respectively. Therefore, to certain values of the quantization values $(Q_1, Q_7)$, $k_1 \times k_7$ values of the transform values $(X_1, X_7)$ correspond, and simultaneously, $k_1 \times k_7$ values of the representative elements $(s_3, s_5)$ correspond. In this instance, in order to settle the representative elements $(s_3, s_5)$, the local quantization values $(q'_3, q'_5)$ are used. In particular, quantization is performed so that the $k_1 \times k_7$ representative elements $(s_3, s_5)$ and local quantization values $(q'_3, q'_5)$ may correspond in a one-by-one correspondence to each other. If the quantization values $(Q_1, Q_7)$ are determined once, then since the remainders $(r_1, r_7)$ and the transform values $(X_1, X_7)$ correspond in a one-by-one correspondence to each other, also the remainders $(r_1, r_7)$ and the representative elements $(s_3, s_5)$ correspond to each other. In the meantime, the ranges of the possible values as the remainders $(r_1, r_7)$ are known in advance. Therefore, the correspondence between the $k_1 \times k_7$ remainders $(r_1, r_7)$ and local quantization values $(q'_3, q'_5)$ is defined taking the values of the representative elements $(s_3, s_5)$ into consideration. Consequently, upon dequantization, since the transform values $(X_1, X_7)$ can be determined from the quantization values $(Q_1, Q_7)$ and the remainders $(r_1, r_7)$ which can be determined from the local quantization values $(q'_3, q'_5)$ while the representative elements $(s_3, s_5)$ can be determined from the transform values $(X_1, X_7)$, dequantization from the local quantization values $(q'_3, q'_5)$ into the representative elements $(s_3, s_5)$ can be performed reversibly.

The correspondence between the remainders $(r_1, r_7)$ and the local quantization values $(q'_3, q'_5)$ depends upon the values of the quantization values $(Q_1, Q_7)$. However, if the representative elements $(s'_3, s'_5)$ for $(X_1, X_7)=(k_1Q_1, k_7Q_7)$, that is, for $(r_1, r_7)=(0, 0)$, are equal, then the correspondence between the remainders $(r_1, r_7)$ and the representative elements $(s_3, s_5)$ is equal even if the quantization values $(Q_1, Q_7)$ are different. Consequently, the correspondence between the remainders $(r_1, r_7)$ and the local quantization values $(q'_3, q'_5)$ can be determined by the representative elements $(s'_3, s'_5)$ for $(X_1, X_7)=(k_1Q_1, k_7Q_7)$. Accordingly, if such correspondences whose number is equal to that of the possible value as the representative elements $(s'_3, s'_5)$ are prepared and described in a table, then transform from the remainders $(r_1, r_7)$ to the local quantization values $(q'_3, q'_5)$ can be realized by referring to the table. Since the determinant of the expression (26) is D equal to that of the matrix of the expression (18), the number of the possible values as the representative elements $(s'_3, s'_5)$ is D, and also the number of necessary correspondences is D.

In order to realize the reversible transform system described above, three tables are required including a table for determination of the representative elements $(s_3, s_5)$ from the transform values $(X_1, X_7)$, another table for definition of reversible quantization of the differences $(X_3-s_3, X_5-s_5)$ and a further table for determination of the local quantization values (q'$_3$, q'$_5$) from the remainders (r$_1$, r$_7$). Here, the number of elements of the table for determination of the representative elements (s$_3$, s$_5$) is equal to the number D of possible values as representative elements. Further, where the quantization periods upon reversible quantization of the differences (X$_3$-s$_3$, X$_5$-s$_5$) are represented by (i$_3$D, i$_5$D) and the scaling factors are represented by (l$_3$, l$_5$), the number of elements of the table for reversible quantization of the values (X$_3$-s$_3$, X$_5$-s$_5$) is i$_3$i$_5$D. The number of elements of the table for determination of the local quantization values (q'$_3$, q'$_5$) from the remainders (r$_1$, r$_7$) is k$_1$k$_7$D which is a product of multiplication of the number k$_1$k$_7$, which is number of possible values as the remainders (r$_1$, r$_7$), by the number D of the representative elements. Accordingly, the total number of required elements of the tables is D(1+i$_3$i$_5$+k$_1$k$_7$). Since actually the values of i$_3$, i$_5$, k$_1$ and k$_7$ are not very large, where the number D is large, the sizes of the required tables are much smaller than those of the prior art.

Further, in the reversible quantization from the transform points (X$_1$, X$_7$, X$_3$, X$_5$) into the quantization values (Q$_1$, Q$_7$, Q$_3$, Q$_5$), the dynamic ranges of the quantization values Q$_1$, Q$_7$, Q$_3$ and Q$_5$ are reduced to 1/k$_1$, 1/k$_7$, (l$_3$/i$_3$D)×m$_3$, and (l$_5$/i$_5$D)×m$_5$ times those of the transform values X$_1$, X$_7$, X$_3$ and X$_5$, respectively. Consequently, if the values of k$_1$, k$_7$, m$_3$, m$_5$, i$_3$, i$_5$, l$_3$ and l$_5$ are determined so that the rates of the changes in dynamic ranges may be equal to each other, then th e dynamic ranges of the quantization values Q$_1$, Q$_7$, Q$_3$ and Q$_5$ can be made substantially equal to each other. Particularly in order to uniform the dynamic ranges while minimizing the redundancies, the values of k$_1$, k$_7$, m$_3$, m$_5$, i$_3$, i$_5$, l$_3$ and l$_5$ should be set so as to satisfy the following equations (27) and (28):

$$k_1 = k_7 = m_3 = m_5 \simeq \sqrt[4]{D} \quad (27)$$

$$\frac{i_3 D}{l_3} = \frac{i_5 D}{l_5} \simeq \sqrt{D} \quad (28)$$

In this manner, with the reversible transform system described above, the sizes of the tables can be reduced remarkably, and the dynamic ranges of transform coefficients can be made substantially equal to each other.

Thus, the first aspect of the present invention described above provides a practical quantization technique for 4×4 linear transform which appears in 8-element reversible discrete cosine transform. For example, where (c$_1$, c$_3$, c$_5$, c$_5$)=(5, 4, 3, 1), the 8-element discrete cosine transform based on the quantization technique of the "Lossless Transform Coding System for Digital Signals" proposed precedently requires a quantization table having at least 2,593$^3$ elements because the determinant D=2,593. In contrast, according to the technique of the present invention, where k$_1$=k$_7$=m$_3$=m$_5$ and the quantization periods in reversible quantization with the matrix of the expression (26) are (2,593, 2,593) and besides the scaling factors are (51, 51), from the condition to make the dynamic ranges uniform, k$_1$=k$_7$=m$_3$=m$_5$=7 are determined, and the total number of elements of the table is 2,593×51. Consequently, the total number of elements of the table is reduced approximately to 1/100,000.

According to another aspect of the present invention, there is provided an inverse transform system for inversely transforming quantization values (Q$_1$, Q$_7$, Q$_3$, Q$_5$) into integer four-element vectors (u$_4$, u$_5$, u$_6$, u$_7$), comprising means for dividing the quantization values (Q$_3$, Q$_5$) by natural numbers (m$_3$, m$_5$) to obtain quotients as global quantization values (q$_3$, q$_5$) and remainders as local quantization values (q'$_3$, q'$_5$), respectively, means for determining remainder values (r$_1$, r$_7$) from the local quantization values (q'$_3$, q'$_5$) based on a third numerical value table, means for multiplying the quantization values (Q$_1$, Q$_7$) by natural numbers (k$_1$, k$_7$) and adding the remainder values (r$_1$, r$_7$) to products of the multiplication to obtain transform values (X$_1$, X$_7$), respectively, means for determining representative elements (s$_3$, s$_5$) from the transform values (X$_1$, X$_7$) based on a fourth table, means for dequantizing the global quantization values (q$_3$, q$_5$) to obtain vectors, means for adding the representative elements (s$_3$, s$_5$) to the vector obtained by the dequantizing means to obtain transform values (X$_3$, X$_5$), and means for linearly transforming the transform values (X$_1$, X$_7$, X$_3$, X$_5$) with an inverse matrix of an integer matrix $$\begin{pmatrix} c_1 & c_7 & c_3 & c_5 \\ c_7 & -c_1 & -c_5 & c_3 \\ c_3 & -c_5 & -c_7 & -c_1 \\ c_5 & c_3 & -c_1 & c_7 \end{pmatrix}$$

to obtain the integer four-element vectors (u$_4$, u$_5$, u$_6$, u$_7$).

The inverse transform system may be constructed such that, first, using the natural numbers k$_1$ and k$_7$, g and h defined by g=c$_1^2$-c$_7^2$+2c$_3$c$_5$ and h=c$_3^2$-c$_5^2$+2c$_1$c$_7$ with the integers c$_1$, c$_3$, c$_5$ and c$_7$, a value of one of gk$_1$Q$_1$+hk$_7$Q$_7$ and gk$_7$Q$_7$-hk$_1$Q$_1$ is calculated from the quantization values Q$_1$ and Q$_7$, next, a remainder is calculated when the obtained value is devided by D defined by D=(c$_1^2$-c$_7^2$+2c$_3$c$_5$)$^2$+(c$_3^2$-c$_5^2$+2c$_1$c$_7$)$^2$, and then, the remainder is used as an index for the third numerical value table.

Or, the inverse transform system may be constructed such that, first, using g and h defined by g=c$_1^2$-c$_7^2$+2c$_3$c$_5$ and h=c$_3^2$-c$_5^2$+2c$_1$c$_7$ with the integers c$_1$, c$_3$, c$_5$ and c$_7$, a value of one of gX$_1$+hX$_7$ and gX$_7$-hX$_1$ is calculated from the transform values X$_1$ and X$_7$, next, a remainder is calculated when the obtained value is devided by D defined by D=(c$_1^2$-c$_7^2$+2c$_3$c$_5$)$^2$+(c$_3^2$-c$_5^2$+2c$_1$c$_7$)$^2$, and then, the remainder is used as an input to the fourth numerical value table.

In the inverse transform system described above, inverse transform from quantization values (Q$_1$, Q$_7$, Q$_3$, Q$_5$) into integer four-element vectors (u$_4$, u$_5$, u$_6$, u$_7$) can be realized in the following manner.

In dequantization from the quantization values (Q$_1$, Q$_7$, Q$_3$, Q$_5$) into transform values (X$_1$, X$_7$, X$_3$, X$_5$), the quantization values (Q$_3$, Q$_5$) are first divided by natural numbers (m$_3$, m$_5$) to obtain quotients (q$_3$, q$_5$) and remainders (q'$_3$, q'$_5$), respectively. Then, using the third numerical value table which describes correspondences opposite to those of the second numerical value table of the reversible transform system according to the first aspect of the present invention, remainder values (r$_1$, r$_7$) are determined from the local quantization values (q'$_3$, q'$_5$). Then, using the remainder values (r$_1$, r$_7$), transform values (X$_1$, X$_7$) are calculated based on X$_1$=Q$_1$k$_1$+r$_1$ and X$_7$=Q$_7$k$_7$+r$_7$, respectively. Meanwhile, differences X$_3$-s$_3$ and X$_5$-s$_5$ are obtained by performing dequantization of the matrix of the expression (26) for the quotients q$_3$ and q$_5$ using the technique of the prior art, and representative elements s$_3$ and s$_5$ are determined from the transform values (X$_1$, X$_7$) calculated as above referring to the fourth table. Then, the representative elements (s$_3$, s$_5$) are added to the vectors obtained by the dequantizing means to obtain transform values (X$_3$, X$_5$). Finally, the transform values (X$_1$, X$_7$, X$_3$, X$_5$), are linearly transformed with an inverse matrix to the matrix of the expression (18) to obtain the original vectors (u$_4$, u$_5$, u$_6$, u$_7$).

Thus, the second aspect of the present invention provides a dequantization system which fully restores original values from quantization values obtained by the reversible transform system according to the first aspect of the present invention.

In the eight-element reversible discrete cosine transform based on the "Lossless Transform Coding System for Digital Signals" proposed precedently, the reversible quantization technique is used only at the last stage provided by the expressions (16) to (18), but removal of redundancies among results of butterfly calculations at the first and middle stages provided by the expressions (10) to (15) is performed by deleting the least significant bit of one of two results of each calculation. However, transform coefficients obtained as a result have dynamic ranges much different from those obtained by actual discrete cosine transform. Therefore, the butterfly calculations in the first and middle stages are replaced by reversible transform with a matrix $$\begin{pmatrix} 1 & 1 \\ 1 & -1 \end{pmatrix}$$

In the eight-element reversible discrete cosine transform obtained by the replacement, the dynamic ranges of quantization values $Q_0$, $Q_1$, $Q_2$, $Q_3$, $Q_4$, $Q_5$, $Q_6$ and $Q_7$ obtained finally can be made substantially uniform by selecting the quantization periods and the scaling factors so that the dynamic ranges of the quantization values may be substantially equal to each other. This is realized by a reversible transform system according to a further or third aspect of the present invention.

In particular, according to the third aspect of the present invention, there is provided a reversible transform system for obtaining eight transform coefficients of quantization values $Q_0$, $Q_1$, $Q_2$, $Q_3$, $Q_4$, $Q_5$, $Q_6$ and $Q_7$ from eight signals of $x_0$, $x_1$, $x_2$, $x_3$, $x_4$, $x_5$, $x_6$ and $x_7$, comprising means for performing transform and reversible quantization of the signals $(x_0, x_7)$, $(x_1, x_6)$, $(x_2, x_5)$ and $(x_3, x_4)$ with a matrix $$\begin{pmatrix} 1 & 1 \\ 1 & -1 \end{pmatrix}$$

to obtain quantization values $(u_0, u_4)$, $(u_2, u_5)$, $(u_3, u_7)$ and $(u_1, u_5)$, means for performing transform and reversible quantization of the quantization values $(u_0, u_1)$ and $(u_2, u_3)$ with the matrix $$\begin{pmatrix} 1 & 1 \\ 1 & -1 \end{pmatrix}$$

to obtain quantization values $(v_0, v_1)$ and $(v_2, v_3)$, means for performing transform and reversible quantization of the quantization values $(v_0, v_2)$ with an integer matrix given by $$\begin{pmatrix} c_4 & c_4 \\ c_4 & -c_4 \end{pmatrix}$$

to obtain quantization values as the quantization values $(Q_0, Q_4)$, means for performing transform and reversible quantization of the quantization values $(v_1, v_3)$ with another integer matrix given by $$\begin{pmatrix} c_2 & c_6 \\ c_6 & -c_2 \end{pmatrix}$$

to obtain quantization values as the quantization values $(Q_2, Q_6)$, and means for performing reversible transform of the quantization values $(u_4, u_5, u_6, u_7)$ to obtain vectors as the quantization values $(Q_1, Q_7, Q_3, Q_5)$.

Thus, the third aspect of the present invention provides eight-element reversible discrete cosine transform wherein reversible quantization is performed at each stage of the eight-element reversible discrete cosine transform so that transform coefficients whose dynamic ranges are uniform and which are proximate to transform coefficients obtained by actual discrete cosine transform. As a result, the coding efficiency is improved, and also the compatibility with conventional eight-element discrete cosine transform is superior.

Similarly, while eight-element reversible inverse discrete cosine transform based on the "Lossless Transform Coding System for Digital Signals" proposed precedently includes, at each of the middle and last stages, a portion where the least significant bit of one of each two inputs is added to the other input and butterfly calculations are performed based on the inputs and then results of the butterfly calculations are multiplied by ½, inverse transform to that of the reversible transform system according to the third aspect of the present invention can be realized by replacing the portion with inverse transform of reversible transform with the matrix given by $$\begin{pmatrix} 1 & 1 \\ 1 & -1 \end{pmatrix}$$

This is realized by an inverse transform system according to a still further of fourth aspect of the present invention.

In particular, according to the fourth aspect of the present invention, there is provided an inverse transform system, comprising means for performing inverse transform of quantization values $(Q_1, Q_7, Q_3, Q_5)$ to obtain vectors $(u_4, u_5, u_6, u_7)$, means for performing dequantization and inverse transform of quantization values $(Q_2, Q_6)$ with a matrix $$\begin{pmatrix} c_2 & c_6 \\ c_6 & -c_2 \end{pmatrix}$$

to obtain vectors $(v_1, v_3)$, means for performing dequantization and inverse transform of quantization values $(Q_0, Q_4)$ with another matrix $$\begin{pmatrix} c_4 & c_4 \\ c_4 & -c_4 \end{pmatrix}$$

to obtain vectors $(v_0, v_2)$, means for performing dequantization and inverse transform of the quantization values $(v_0, v_1)$ and $(v_2, v_3)$ with a matrix $$\begin{pmatrix} 1 & 1 \\ 1 & -1 \end{pmatrix}$$

to obtain vectors $(u_0, u_1)$ and $(u_2, u_3)$, and means for performing dequantization and inverse transform of the vectors $(u_0, u_4)$, $(u_2, u_6)$, $(u_3, u_7)$ and $(u_1, u_5)$ with the matrix $$\begin{pmatrix} 1 & 1 \\ 1 & -1 \end{pmatrix}$$

to obtain vectors $(x_0, x_7)$, $(x_1, x_6)$, $(x_2, x_5)$, and $(x_3, x_4)$.

Thus, the fourth aspect of the present invention provides an inverse transform system which fully restores original signals from transform coefficients obtained by the reversible transform system according to the third aspect of the present invention.

In the reversible transform system according to the first aspect of the present invention described above, the representative elements ($s_3$, $s_5$) are determined from the first numerical value table, and are used as indices for the second numerical value table. In addition, in the inverse transform system according to the second aspect of the present invention described above, the representative elements ($s_3$, $s_5$) are used as indices for the third numerical value table, and determined from the fourth numerical value table. Thus, a technique of determining the representative elements ($s_3$, $s_5$) will be described below. Where quotients and remainders when components of vectors ($hX_3+gX_5$, $hX_5-gX_3$), which are obtained by multiplying the transform points ($X_3$, $X_5$) by the transposed matrix of the expression (26), are divided by the determinant D are represented by ($\alpha_3$, $\alpha_5$) and ($\rho_3$, $\rho_5$), respectively, the values of the remainders ($\rho_3$, $\rho_5$) are equal to each other for the transform points ($X_3$, $X_5$) which have the same representative elements ($s_3$, $s_5$). In other words, the representative elements ($s_3$, $s_5$) can be determined from the values of the remainders ($\rho_3$, $\rho_5$).

Here, the possible values as the remainders ($\rho_3$, $\rho_5$) are examined. Where vectors obtained by subtracting results of multiplication of the quotients ($\alpha_3$, $\alpha_5$) by the matrix of the expression (26) from the transform points ($X_3$, $X_5$), are represented by ($t_3$, $t_5$), respectively, the remainders ($\rho_3$, $\rho_5$) are given by $$\begin{pmatrix} \rho_3 \\ \rho_5 \end{pmatrix} = \begin{pmatrix} h & g \\ -g & h \end{pmatrix} \begin{pmatrix} t_3 \\ t_5 \end{pmatrix} \quad (29)$$

Since the values $t_3$ and $t_5$ are integers, it can be seen that the remainders ($\rho_3$, $\rho_5$) represent transform points of the transform with the transposed matrix of the expression (26) which satisfy $0 \leq \rho_3 \leq D-1$ and $0 \leq \rho_5 \leq D-1$. Generally, both of the remainders $\rho_3$ and $\rho_5$ are required in order to determine the representative elements ($s_3$, $s_5$). However, where g and h are prime relative to each other, only one value is possible as the remainder $\rho_3$ for each remainder $\rho_5$. Accordingly, by describing correspondence between one of the remainder $\rho_3$ obtained when $hX_3+gX_5$ is divided by D and the remainder $\rho_5$ obtained when $hX_5-gX_3$ is divided by D and the representative elements ($s_3$, $s_5$) in a table, the representative elements ($s_3$, $s_5$) can be determined.

Further, it can be proved that the possible values as the transform points ($X_1$, $X_7$) which provide the same representative elements ($s_3$, $s_5$) are limited to $$\begin{pmatrix} X_1 \\ X_7 \end{pmatrix} = \begin{pmatrix} g & -h \\ h & g \end{pmatrix} \begin{pmatrix} n_3 \\ n_4 \end{pmatrix} + \begin{pmatrix} s_1 \\ s_7 \end{pmatrix} \quad (30)$$

where $n_3$ and $n_4$ are arbitrary integers, and ($s_1$, $s_7$) are integer vectors. Since the integer vectors ($s_1$, $s_7$) and the representative elements ($s_3$, $s_5$) correspond in a one-by-one correspondence to each other, it can be recognized that, using a similar logic to that described above, the integer vectors ($s_1$, $s_7$) are determined from remainders obtained when ($gX_1+hX_7$, $gX_7-hX_1$) are divided by D, and the representative elements ($s_3$, $s_5$) can be determined from the integer vectors ($s_1$, $s_7$). Consequently, where g and h are prime relative to each other, by describing correspondences between one of the remainder obtained when $hX_1+gX_7$ is divided by D and the remainder obtained when $hX_7-gX_1$ is divided by D and the representative elements ($s_3$, $s_5$) in a table, the representative elements ($s_3$, $s_5$) can be determined. Where g and h are prime relative to each other, the representative elements ($s_3$, $s_5$) are determined from the numerical value table using the relationship just described. Further, the foregoing is applied to ($X_1$, $X_7$)=($k_1Q_1$, $k_7Q_7$), and resulting remainders are used as indices for the second and third numerical value tables which describe the relationship between the remainders ($r_1$, $r_7$) and the local quantization values ($q'_3$, and $q'^5$).

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
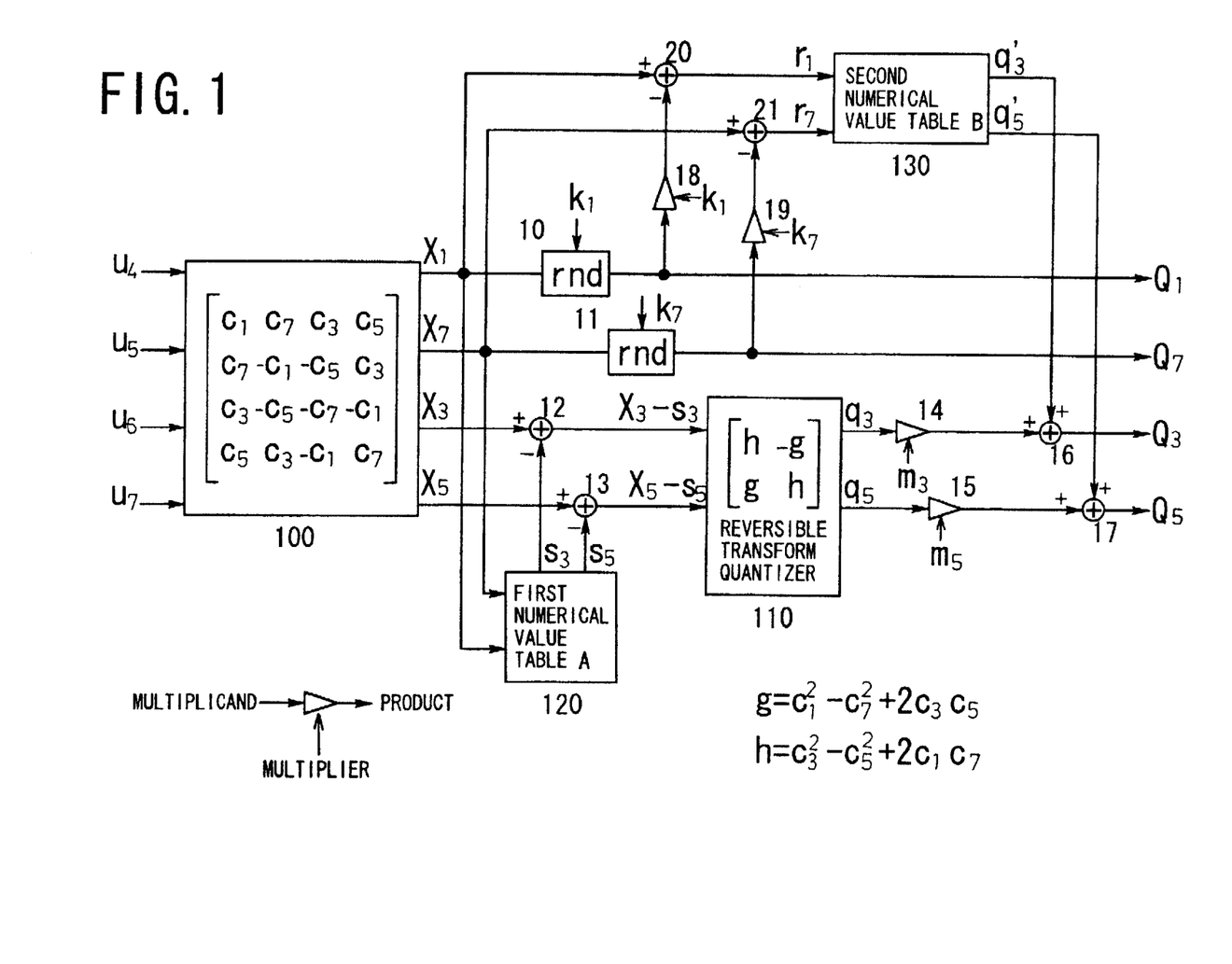
FIG. 1 is a block diagram showing a transform coding system to which the present invention is applied.

Referring first to FIG. 1, there is shown a transform coding system to which the present invention is applied. Integer four-element vectors ($u_4$, $u_5$, $u_6$, $u_7$) are transformed by a transformer 100 so that transform values ($X_1$, $X_7$, $X_3$, $X_5$) are obtained. Of the transform values $X_1$, $X_7$, $X_3$ and $X_5$, the transform values $X_1$ and $X_7$ are divided by natural numbers $k_1$ and $k_7$ and rounded or half-adjusted to obtain quantization values $Q_1$ and $Q_7$ by computing elements 10 and 11, respectively. The quantization values $Q_1$ and $Q_7$ are multiplied by the natural numbers $k_1$ and $k_7$ by multipliers 18 and 19 and then subtracted from the transform values $X_1$ and $X_7$ by adders 20 and 21 to obtain remainder values $r_1$ and $r_7$ respectively. Meanwhile, representative elements ($s_3$ and $s_5$) are obtained from the transform values $X_1$ and $X_7$ based on a first numerical value table 120. The representative elements ($s_3$ and $s_5$) are subtracted from the transform values ($X_3$, $X_5$) by adders 12 and 13 so that differences ($X_3-s_3X_5-s_5$) are obtained. For the differences ($X_3-s_3$, $X_5-s_5$), reversible transform quantization based on the matrix of the expression (26) given hereinabove is performed by a reversible quantizer 110 to obtain global quantization values ($q_3$, $q_5$). Further, using a second numerical value table 130, local quantization values ($q'_3$, $q'_5$) are obtained from the remainder values $r_1$ and $r_7$. Then, ranges $m_3$ and $m_5$ of the local quantization values $q'_3$ and $q'_5$ are multiplied by the global quantization values $q_3$ and $q_5$ by multipliers 14 and 15, respectively, and the local quantization values $q'_3$ and $q'_5$ are added to the products by adders 16 and 17 to obtain quantization values $Q_3$ and $Q_5$, respectively.

Figure 2:
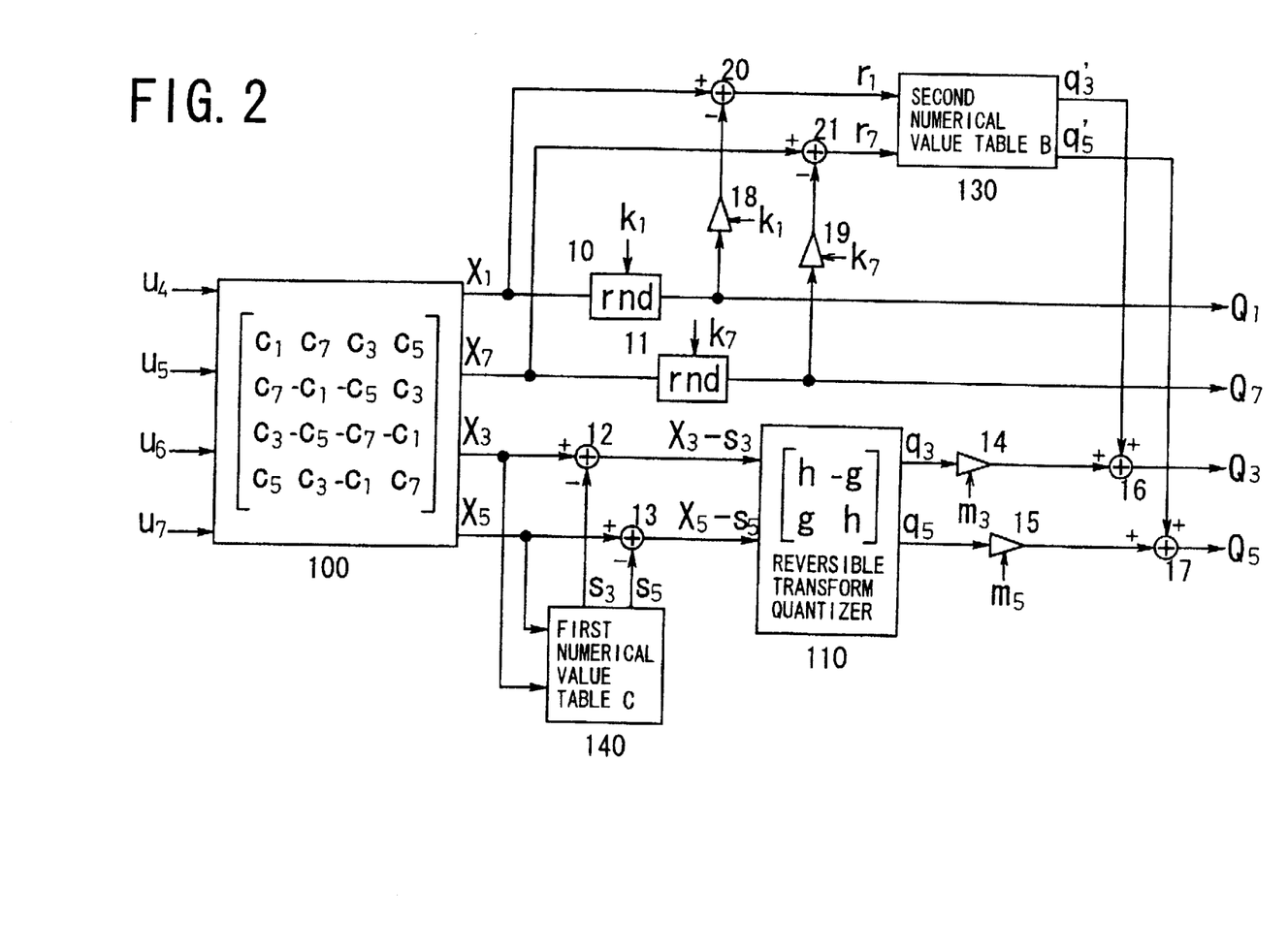
FIG. 2 is a similar view but showing a modification to transform coding system of FIG. 1.

FIG. 2 shows another transform coding system to which the present invention is applied. The transform coding system of FIG. 2 is a modification to and includes common components to those of the transform coding system of FIG. 1, but is different only in that it includes a first numerical value table 140 in place of the first numerical value table 120 and not the transform values $X_1$ and $X_7$ but the transform values $X_3$ and $X_5$ are inputted to the first numerical value table 120.

Figure 3:
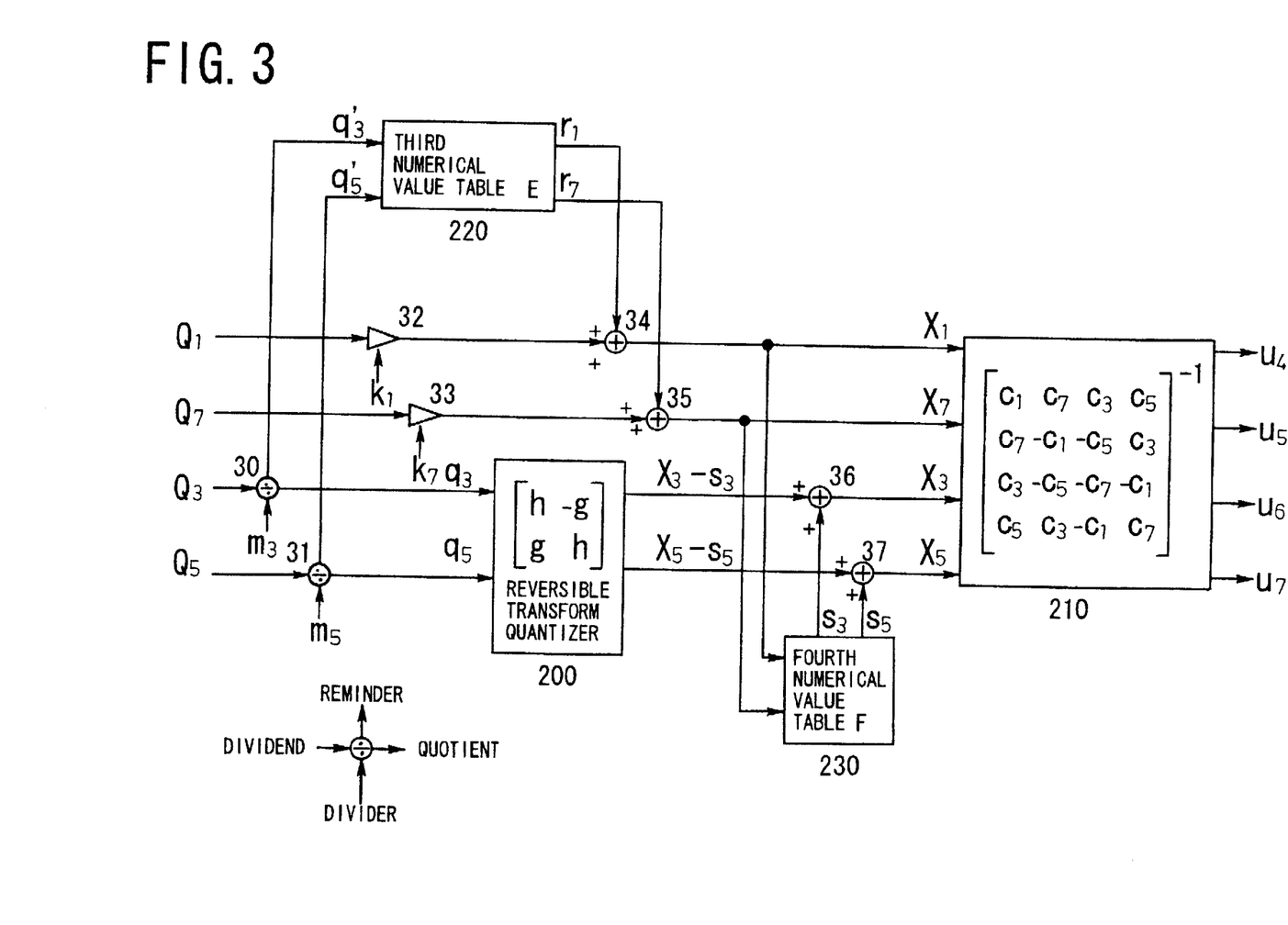
FIG. 3 is a block diagram showing an inverse transform system to which the present invention is applied.

Referring now to FIG. 3, there is shown an inverse transform system to which the present invention is applied. Of quantization values ($Q_1$, $Q_7$, $Q_3$, $Q_5$), the quantization values $Q_3$ and $Q_5$ are divided by ranges $m_3$ and $m_5$ of local quantization values $q'_3$ and $q'_5$ therefor by integer dividers 30 and 31, respectively, whereupon the quotients are obtained as global quantization values $q_3$ and $q_5$ and the remainders are obtained as local quantization values $q'_3$ and $q'_5$, respectively. Then, using a third numerical value table 220, remainder values $r_1$ and $r_7$ are obtained from the local quantization values $q'_3$ and $q'_5$. Meanwhile, the quantization values $Q_1$ and $Q_7$ are multiplied by natural numbers $k_1$ and $k_7$ by multipliers 32 and 33, and the remainder values $r_1$ and $r_7$ are added to the products of the multipliers 32 and 33 by adders 34 and 35 to obtain dequantization values $X_1$ and $X_7$ of the quantization values $Q_1$ and $Q_7$, respectively. Further, a dequantizer 200 performs dequantization based on the matrix of the expression (26) given hereinabove to obtain difference values $X_3-s_3$ and $X_5-s_5$. Meanwhile, values of the representative elements ($s_3$, $s_5$) are determined from the formerly calculated dequantization values $X_1$ and $X_7$ using a fourth numerical value table 230. The representative elements $s_3$ and $s_5$ are added to the difference values $X_3-s_3$ and $X_5-s_5$ by adders 36 and 37 to obtain the dequantization values $X_3$ and $X_5$ for the quantization values $Q_3$ and $Q_5$. Finally, an inverse transformer 210 performs linear transform based on the inverse matrix of the expression (18) above for the dequantization values ($X_1$, $X_7$, $X_3$, $X_5$) to obtain integer four-element vectors ($u_4$, $u_5$, $u_6$, $u_7$).

Figure 4:
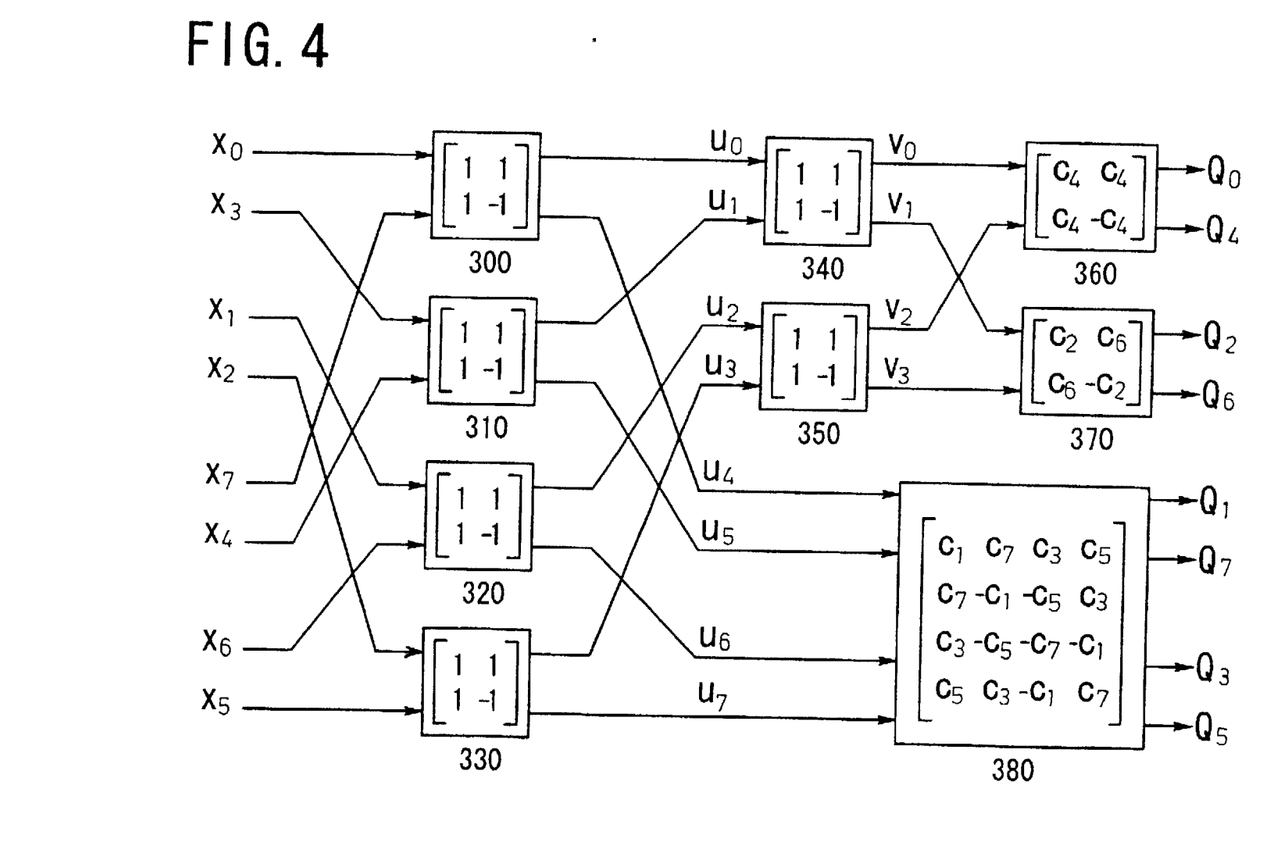
FIG. 4 is a block diagram showing an eight-element reversible discrete cosine transform system to which the present invention is applied.

A reversible transform system to which the present invention is applied is illustrated in FIG. 4. Referring to FIG. 4, the technique employed in the transform system illustrated in FIG. 4 is similar to the decomposition technique of the eight-element reversible discrete cosine transformer illustrated in FIG. 6, but is different in that a transform and reversible quantization based on a matrix $$\begin{pmatrix} 1 & 1 \\ 1 & -1 \end{pmatrix}$$

are employed in place of the portion of the decomposition technique of FIG. 6 wherein butterfly calculations are performed at the first and middle stages and the least significant bit of one of the two results for each calculation is deleted. By employing reversible quantization also for the first and middle stages, redundancies can be removed while making the dynamic ranges of both of the two results for each calculation substantially equal to each other. For example, if the quantization periods of reversible transform quantization based on the matrix are set to (14, 10) and the scaling multipliers are set to (10, 7), then the dynamic ranges reduce to $^{19}/_{14}$ and $^7/_{10}$, respectively. Here, $^{19}/_{14} \fallingdotseq ^7/_{10}$ and accordingly, only little different appears between the dynamic ranges of quantization values. In this manner, if the quantization periods and the scaling multipliers are determined such that the dynamic ranges of each two numbers may be substantially equal to each other in reversible transform quantization of each stage, then also the dynamic ranges of quantization values ($Q_0$, $Q_1$, $Q_2$, $Q_3$, $Q_4$, $Q_5$, $Q_6$, $Q_7$) obtained finally are substantially equal to each other.

Figure 5:
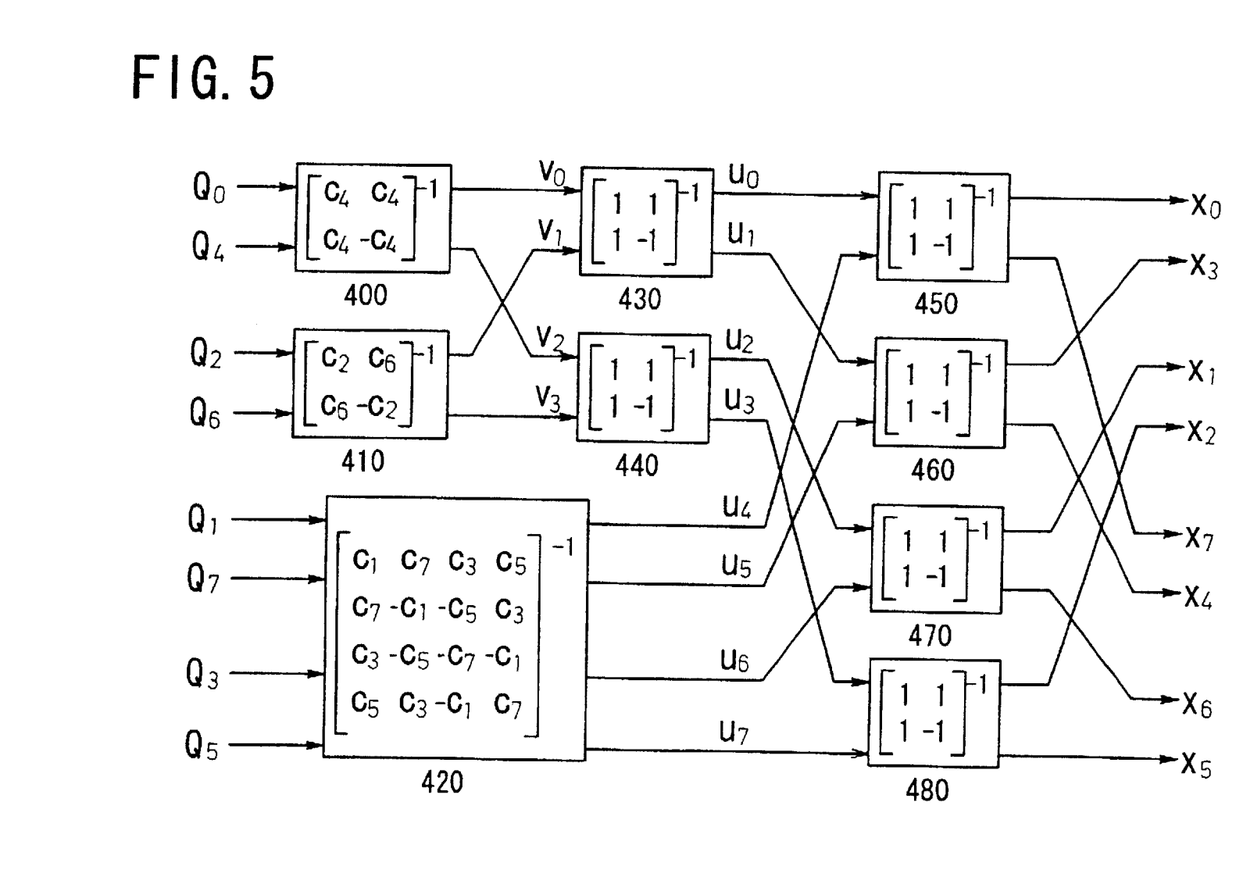
FIG. 5 is a block diagram showing an eight-element reversible discrete cosine inverse transform system to which the present invention is applied.

FIG. 5 shows an inverse transform system to which the present invention is applied. Referring to FIG. 5, the technique of the inverse transform system is similar to the decomposition technique of the eight-element reversible discrete cosine transform illustrated in FIG. 6, but is different in that dequantization and inverse transform based on a matrix $$\begin{pmatrix} 1 & 1 \\ 1 & -1 \end{pmatrix}$$

are employed in place of the portion of the decomposition technique of FIG. 6 wherein, at the middle and last stages, the least significant bit of one of two inputs for each butterfly calculation is added to the other input and butterfly calculations are performed based on the inputs and then results of the butterfly calculations are divided to ½.

Referring back to FIG. 1, when g and h are relatively prime, a function $z(X_1, X_7)$ is calculated from the transform values $X_1$ and $X_7$ and the representative elements ($s_3$ and $s_5$) are determined from the value of the function $Z(X_1, X_7)$ using the first numerical value table 120 shown in FIG. 1. Here, the function $z(x, y)$ is a function which gives back a remainder when gx+hy is divided by the determinant D. A concrete example of the first numerical value table 120 where ($c_1$, $c_3$, $c_5$, $c_7$)=(5, 4, 3, 1) is given below. In this instance, g=48, h=17, and D=2,593, and g and h are relatively prime. The first numerical value table in this instance is such as Table 1 given below. Alternatively, the function $z(x, y)$ may be another function which gives back a remainder when gy−hx is divided by D. Also in this instance, a table similar to table 1 can be produced as the first numerical value table.

TABLE 1

| $z(X_1, X_7)$ | $s_3$ | $s_5$ |
|---|---|---|
| 0 | 0 | 0 |
| 1 | −7 | 17 |
| 2 | 17 | −31 |
| 3 | 10 | −14 |
| . | . | . |
| . | . | . |
| . | . | . |
| 2592 | 7 | −17 |

Alternatively, the representative elements ($s_3$, $s_5$) may be determined from the value of another function $z(X_5, X_3)$ determined from the transform values $X_3$ and $X_5$ based on the first numerical value table 140 shown in FIG. 2. Also in this instance, a table similar to Table 1 above can be produced as the first numerical value table.

It is also possible to calculate a value of the function $z(k_1Q_1, k_7Q_7)$ from values $k_1Q_1$ and $k_7Q_7$ and determine, using the value of the function $z(k_1Q_1)$ $k7Q_7$) as an index, local quantization values ($q'_3$, $q'_5$) based on the second numerical value table 130 of FIG. 1 or 2. An example of the second numerical value table produced with $k_1=k_7=m_3=m_5=3$ when ($c_1$, $c_3$, $c_5$, $c_7$)=(5, 4, 3, 1) is given below. If it is taken into consideration that, when the index $z(k_1Q_1, k_7Q_7)=0$, the correspondence between remainder values ($r_1$, $r_7$) and the ($s_3$, $s_5$) is such as illustrated in Table 2, then the correspondence between the remainder values ($r_1$, $r_7$) and the local quantization values ($q'_3$, $q'_5$) can be defined in such a manner as, for example, seen in Table 3. Similarly, such a table can be produced for each value of the function $z(k_1Q_1, k_7Q_7)$, and the entire tables produced for all values of the functions $z(k_1Q_1, k_7Q_7)=0, 1, \ldots, 2,592$ in this manner make the second numerical value table.

TABLE 2

| $r_1$ | $r_7$ | $s_3$ | $s_5$ |
|---|---|---|---|
| −1 | −1 | −24 | −17 |
| −1 | 0 | −19 | 12 |
| −1 | 1 | 17 | −24 |
| 0 | −1 | 12 | 19 |
| 0 | 0 | 0 | 0 |
| 0 | 1 | −12 | −19 |
| 1 | −1 | −17 | 24 |
| 1 | 0 | 19 | −12 |
| 1 | 1 | 24 | 17 |

TABLE 3

| $r_1$ | $r_7$ | $q'_3$ | $q'_5$ |
|---|---|---|---|
| −1 | −1 | −1 | −1 |
| −1 | 0 | −1 | 0 |
| −1 | 1 | 1 | −1 |
| 0 | −1 | 0 | 1 |
| 0 | 0 | 0 | 0 |
| 0 | 1 | 0 | −1 |
| 1 | −1 | −1 | 1 |
| 1 | 0 | 1 | 0 |
| 1 | 1 | 1 | 1 |

Or, it is possible to calculate a value of the function $z(k_1Q_1, k_7Q_7)$ from the values $k_1Q_7$ and $k_7Q_7$ and determine, using the value of the function $z(k_1Q_1, k_7Q_7)$ as an index, remainder values $(r_1, r_7)$ based on the third numerical value table 220 shown in FIG. 3. By producing, as the third numerical value table 220, a table which provides a relationship opposite to that of the second numerical value table used in the transform coding system of FIG. 1 or 2, full inverse transform can be realized. For example, where Table 3 is used for the index $z(k_1Q_1, k_7Q_7)=0$ as the second numerical value table of the transform coding system of FIG. 1 or 2, the table for the index $z(k_1Q_1, k_7Q_7)=0$ of the third numerical value table is such as Table 4 given below. The entire tables produced for all values of the functions $z(k_1Q_1, k_7Q_7)$ in this manner make the third numerical value table 220.

TABLE 4

| $q'_3$ | $q'_5$ | $r_1$ | $r_7$ |
|---|---|---|---|
| −1 | −1 | −1 | −1 |
| −1 | 0 | −1 | 0 |
| −1 | 1 | 1 | −1 |
| 0 | −1 | 0 | 1 |
| 0 | 0 | 0 | 0 |
| 0 | 1 | 0 | −1 |
| 1 | −1 | −1 | 1 |
| 1 | 0 | 1 | 0 |
| 1 | 1 | 1 | 1 |

Also, it is possible to calculate a value of the function $z(X_1, X_7)$ from the transform coefficients $X_1$ and $X_7$ and determine, using the value of function $z(X_1, X_7)$ as an index, representative elements $(s_3, s_5)$ based on the fourth numerical value table 230 shown in FIG. 3. Here, the fourth numerical value table 230 is required only to be the same as the first numerical value table 120.

Having now fully described the invention, it will be apparent to one of ordinary skill in the art that many changes and modifications can be made thereto without departing from the spirit and scope of the invention as set forth herein.

What is claimed is:

1. A reversible transform system for reversibly transforming integer four-element vectors $(u_4, u_5, u_6, u_7)$ into quantization values $(Q_1, Q_7, Q_3, Q_5)$, comprising:

means for linearly transforming the integer four-element vectors $(u_4, u_5, u_6, u_7)$ with an integer matrix $$\begin{pmatrix} c_1 & c_7 & c_3 & c_5 \\ c_7 & -c_1 & -c_5 & c_3 \\ c_3 & -c_5 & -c_7 & -c_1 \\ c_5 & c_3 & -c_1 & c_7 \end{pmatrix}$$

to obtain transform values $(X_1, X_7, X_3, X_5)$;

means for dividing the transform coefficients $X_1$ and $X_7$ by natural numbers $k_1$ and $k_7$ and half-adjusting quotients of the division to obtain quantization values $Q_1$ and $Q_7$, respectively;

means for multiplying the natural numbers $k_1$ and $k_7$ by the quantization values $Q_1$ and $Q_7$ to obtain products $k_1Q_1$ and $k_7Q_7$ and subtracting the products $k_1Q_1$ and $k_7Q_7$ from the transform values $X_1$ and $X_7$ to obtain remainder values $r_1$ and $r_7$, respectively;

means for determining representative elements $(s_3, s_5)$ based on a first numerical value table using the transform values $(X_1, X_7)$ or the transform values $(X_3, X_5)$;

means for subtracting the representative elements $(s_3, s_5)$ from the transform values $(X_3, X_5)$, respectively, to obtain vectors;

means for reversibly transforming and quantizing the vectors obtained by said subtracting means to obtain global quantization values $(q_3, q_5)$;

means for determining local quantization values $(q'_3, q'_5)$ of the transform values $(X_3, X_5)$ from the remainders $(r_1, r_7)$ based on a second numerical value table; and means for multiplying the global quantization values $(q_3, q_5)$ by natural numbers $(m_3, m_5)$ and adding the local quantization values $(q'_3, q'_5)$ to products of the multiplication to obtain quantization values $(Q_3, Q_5)$ of the transform values $(X_3, X_5)$, respectively.

2. A reversible transform system as claimed in claim 1, wherein, first, using g and h defined by $g=c_1^2-c_7^2+2c_3 c_5$ and $h=c_3^2-c_5^2+2c_1 c_7$ with the integers $c_1, c_3, c_5$ and $c_7$, a value of one of $gX_1+hX_7$, $gX_7-hX_1$, $hX_3+gX_5$, and $hX_5-gX_3$ is calculated from the transform values $X_1, X_3, X_5$ and $X_7$, next, a remainder is calculated when the obtained value is divided by D defined by $D=(c_1^2-c_7^2+2c_3c_5)^2+(c_3^2-c_5^2+2c_1c_7)^2$, and then, the remainder is used as an input to said first numerical value table.

3. A reversible transform system as claimed in claim 1, wherein, first, using the natural numbers $k_1$ and $k_7$, g and h defined by $g=c_1^2-c_7^2+2c_3c_5$ and $h=c_3^2-c_5^2+2c_1c_7$ with the integers $c_1, c_3, c_5$ and $c_7$, a value of one of $gk_1Q_1+hk_7Q_7$ and $gk_7Q_7-hk_1Q_1$ is calculated from the quantization values $Q_1$ and $Q_7$, next, a remainder is calculated when the obtained value is divided by D defined by $D=(c_1^2-c_7^2+2c_3c_5)^2+(c_3^2-c_5^2+2c_1c_7)^2$, and then, the remainder is used as an index for said second numerical value table.

4. An inverse transform system for inversely transforming quantization values $(Q_1, Q_7, Q_3, Q_5)$ into integer four-element vectors $(u_4, u_5, u_6, u_7)$, comprising:

means for dividing the quantization values $(Q_3, Q_5)$ by natural numbers $(m_3, m_5)$ to obtain quotients as global quantization values $(q_3, q_5)$ and remainders as local quantization values $(q'_3, q'_5)$, respectively;

means for determining remainder values ($r_1$, $r_7$) from the local quantization values ($q'_3$, $q'_5$) based on a third numerical value table;

means for multiplying the quantization values ($Q_1$, $Q_7$) by natural numbers ($k_1$, $k_7$) and adding the remainder values ($r_1$, $r_7$) to products of the multiplication to obtain transform values ($X_1$, $X_7$), respectively;

means for determining representative elements ($s_3$, $s_5$) from the transform values ($X_1$, $X_7$) based on a fourth numerical value table;

means for dequantizing the general situation quantization values ($q_3$, $q_5$) to obtain vectors;

means for adding the representative elements ($s_3$, $s_5$) to the vector obtained by said dequantizing means to obtain transform values ($X_3$, $X_5$); and means for linearly transforming the transform values ($X_1$, $X_7$, $X_3$, $X_5$) with an inverse matrix of an integer matrix $$\begin{pmatrix} c_1 & c_7 & c_3 & c_5 \\ c_7 & -c_1 & -c_5 & c_3 \\ c_3 & -c_5 & -c_7 & -c_1 \\ c_5 & c_3 & -c_1 & c_7 \end{pmatrix}$$

to obtain the integer four-element vectors ($u_4$, $u_5$, $u_6$, $u_7$).

5. An inverse transform system as claimed in claim 4, wherein, first, using the natural numbers $k_1$ and $k_7$, g and h defined by $g=c_1^2-c_7^2+2c_3c_5$ and $h=c_3^2-c_5^2+2c_1c_7$ with the integers $c_1$, $c_3$, $c_5$ and $c_7$, a value of one of $gk_1Q_1+hk_7Q_7$ and $gk_7Q_7-hk_1Q_1$ is calculated from the quantization values $Q_1$ and $Q_7$, next, a remainder is calculated when the obtained value is divided by D defined by $D=(c_1^2-c_7^2+2c_3c_5)^2+(c_3^2-c_5^2+2c_1c_7)^2$, and then, the remainder is used as an index for said third numerical value table.

6. An inverse transform system as claimed in claim 4, wherein, first, using g and h defined by $g=c_1^2-c_7^2+2c_3c_5$ and $h=c_3^2-c_5^2+2c_1c_7$ with the integers $c_1$, $c_3$, $c_5$ and $c_7$, a value of one of $gX_1+hX_7$ and $gX_7-hX_1$ is calculated from the transform values $X_1$ and $X_7$, next, a remainder is calculated when the obtained value is divided by D defined by $D=(c_1^2-c_7^2+2c_3c_5)^2+(c_3^2-c_5^2+2c_1c_7)^2$, and then, the remainder is used as an input for said fourth numerical value table.

* * * * *